March 15, 1949.　　　　G. HELM　　　　2,464,573
PROOFING CABINET AND PAN RACK
Filed March 8, 1945　　　　　　　　　　　　　2 Sheets-Sheet 1
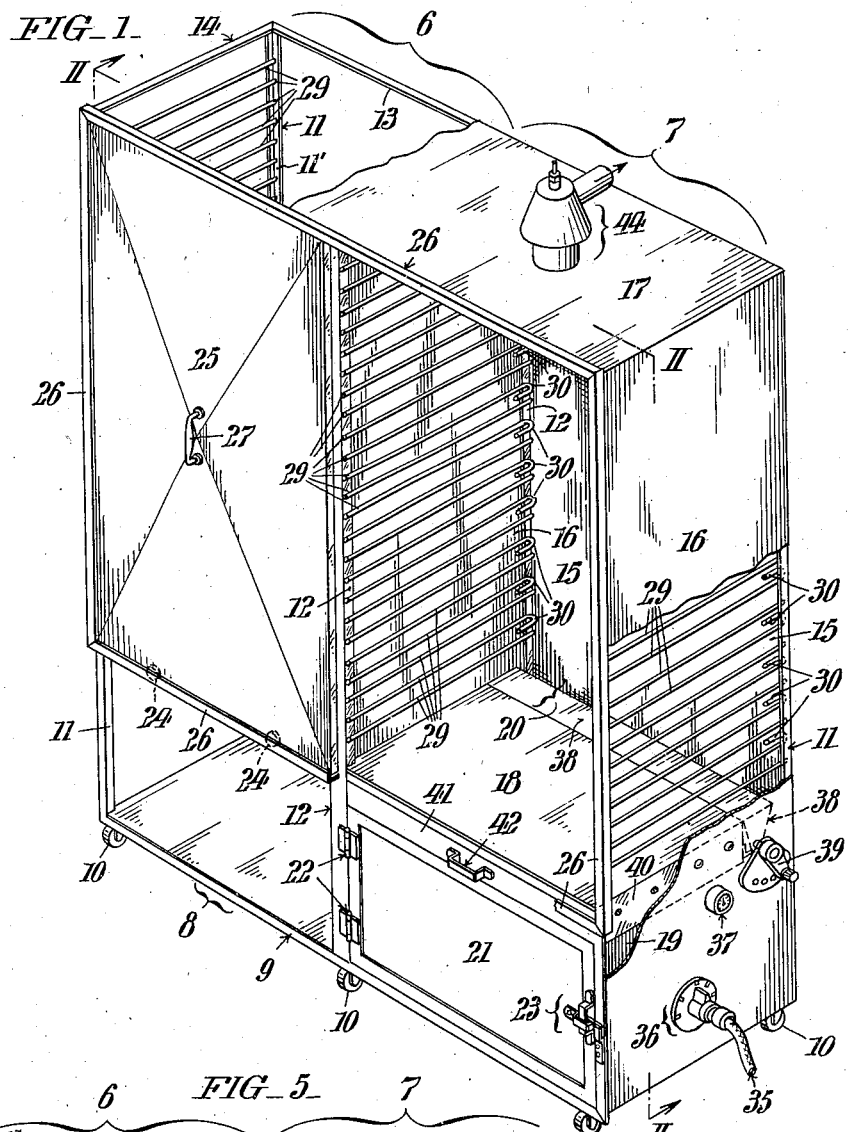
FIG_1
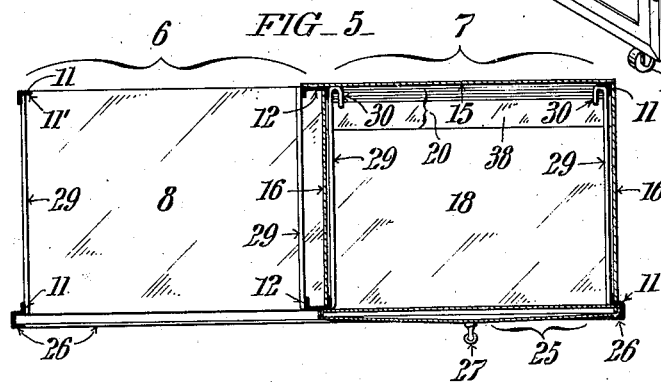
FIG_5
INVENTOR:
George Helm,
BY Paul & Paul
ATTORNEYS.

March 15, 1949.  G. HELM  2,464,573
PROOFING CABINET AND PAN RACK
Filed March 8, 1945  2 Sheets-Sheet 2
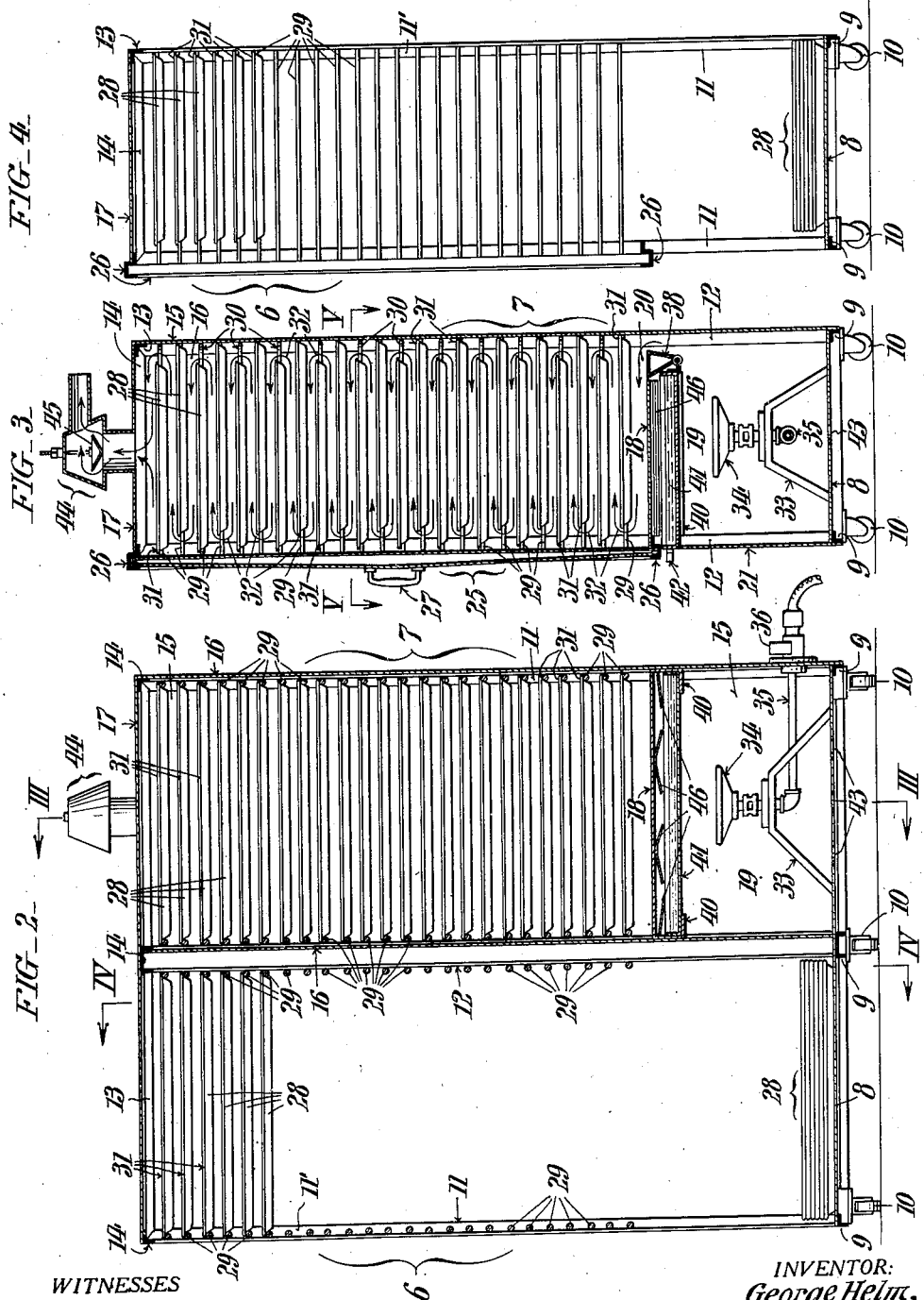
WITNESSES
Hubert Fuchs
Thomas W. Kerr Jr.
INVENTOR:
George Helm,
BY Paul & Paul
ATTORNEYS.

Patented Mar. 15, 1949

2,464,573

UNITED STATES PATENT OFFICE 2,464,573

PROOFING CABINET AND PAN RACK

George Helm, Philadelphia, Pa.

Application March 8, 1945, Serial No. 581,649

3 Claims. (Cl. 126—281)

This invention relates to devices or means useful for conditioning dough and the like after kneading or mixing; and it has for a primary object the provision of a combined proofing-cabinet and storage rack for empty pans, bread, rolls, cakes, and the like.

Another object is to provide a combination proofing-cabinet and pan rack that will occupy a minimum amount of floor space while utilizing and storing a maximum number of pans without relative interference.

A still further object of this invention is to provide a combination cabinet and rack of the above indicated species including means for variably controlling the degrees of heat and humidity in the proofing section, and at the same time enabling a maximum circulation therethrough of the moist gases.

Other objects, with ancillary advantages, have reference to structural details and refinements, whereby the efficiency of such proofing and rack means, as above indicated, is considerably increased.

While the foregoing definitions are indicative, in a general way, of the aims of this invention, others will be evident to those skilled in the art upon a full understanding of the construction, combination, arrangement, and operation of the means hereinafter fully disclosed; but it will also be appreciated that the invention is susceptible of other embodiments or structurally modified forms coming equally within the terms and scope of the concluding claims.

In the accompanying drawings:

Fig. 1 is a perspective view of a preferred form of combined dough proofing-cabinet and pan rack constructed in accordance with this invention, the door for the cabinet being shifted laterally to expose the interior of said cabinet, and portions of the top and one side wall broken out to better illustrate important features.

Fig. 2, Sheet 2, is a vertical section through the means shown in Fig. 1, and taken approximately as indicated by the angled arrows II—II thereon.

Fig. 3 is a vertical section taken substantially as indicated by the arrows III—III shown in Fig. 2.

Fig. 4 is a similar section, but taken as conventionally indicated by the arrows IV—IV in Fig. 2; and Fig. 5, Sheet 1, is a horizontal section taken substantially as indicated by the arrows V—V in Fig. 3.

In describing the form of this invention exemplified by the above referred to drawings herewith, specific terms will be employed for the sake of clarity, but it is to be understood the scope of said invention is not thereby limited; each such term being intended to embrace all equivalents which perform the same function for an analogous purpose.

Referring more particularly to the drawings the novel combination proofing-cabinet and pan rack of this invention conveniently comprises a rectangular structure including an open cooling or storage section or rack, with an adjoining enclosed proofing section or box comprehensively designated 6 and 7, respectively. The combination unit 6, 7 preferably includes a sheet metal base or platform 8 reinforced by surrounding standard members 9 of structural metal and fitted with suitable swivel castors 10. Vertical corner posts or angles 11 extend upward from the platform 8 with intervening channels 12 said angles and channels being connected by an upper rear angle-section brace-bar 13 and by similar end or side and intervening bars 14. The proofing-section 7 has a back wall 15 and side walls 16, also of sheet metal, and an upper wall 17 which latter extends over the rack 6 to form a top or roof therefor. It is to be observed that the proofing section or cabinet 7 is subdivided by a horizontal bottom wall or partition 18 to form a lower combustion chamber 19, said partition 18 extending from the front of the cabinet 7 into spacial relation with respect to the back wall 15 to afford a communicating passage or throat 20 between said chamber 19 and the cabinet 7, for purposes later on set forth. The chamber 19 is closed in, at the front, by a door 21 hinged to the intermediate channel section upright 12 at 22, said door being held closed by an appropriate latching means 23.

The proofing chamber 7, above the wall or partition 18, is closable by a sheet metal door 25 mounted on anti-friction means 24 graphically indicated in Fig. 1 only, said door being slidable laterally in a grooved rectangular frame 26, extending wholly across the combined rack 6 and cabinet 7, as well as upwardly from the level of the wall or partition 18 to the top of the combined rack and cabinet 6, 7, all as shown in Figs. 1 and 3, said door 25 being provided with a handle 27. Incidentally the door 25 is made to a width that when in position to close the proofing cabinet 7 it partially overlaps the channel 12 as shown in Fig. 5; while when shifted to the position shown in Fig. 1 to afford access to the cabinet 7, it correspondingly laps said channel and covers the front of the rack 6.

To support standard baking pans 28 in the rack 6 or in the proofing-cabinet 7, use is preferably made of vertically and evenly spaced transverse guide rods 29. As shown, these rods 29 are of a length to fit across the front flange and abut the inner face of the rear flanges of the corner posts or angles 11, as well as on the outer faces of the flange of the respective intervening channel-sections 12, said rods being welded or otherwise rigidly secured in place. Particular attention is directed to the fact that in the proofing-cabinet 7, alternate of the rods 29 are formed at their inner ends, or adjoining the back wall 15, with approximately horizontal hook bends 30 of uniform size, which function as stops to limit inward movement of the pans 28 supported thereby; whereas the laterally directed flange portions 11' of the rear posts 11 provide stoppage for the pans 28 when placed on the guide rods 29 in the rack section 6. On reference to Fig. 3 it will be seen, commencing with the lowermost pan 28, that each alternate pan 28 has its inner beaded-over, or wired edge 31 in abutment with the back wall 15, whereas the relatively intervening pans 28 are arrested in evenly spaced relation away from said wall by the hook bends 30. In other words, the complete stack of pans 28 are arranged in staggered relation as conventionally indicated by the respectively associated U-shaped direction indicating arrows 32 for a purpose now to be explained. It is here emphasized that by the described manner of sustaining the spaced pans 28, the bottoms of said pans are prevented from unsanitary contacts with the content of those immediately therebelow. Still further by supporting the pans 28 by the opposed beaded or wired edges on the round section rods 29 an effective means is provided to prevent the collection of dough or the like thereat, as generally obtains when such pans are supported on flat guide bars, or by being placed on shelf-like side members as heretofore; whereas by arranging said pans alternatingly with respect to each other, as shown, there is defined an even zig-zag passage for the flow therebetween of the proofing moist gases. It is also to be noted that by the arrangement, and support of, the pans 28 in the manner set forth, a maximum number of said pans for contents low in height, can be placed within the cabinet 7 for the proofing period. It is furthermore to be noted that different depths of pans 28 may be supported, on the guide rods 29, by the simple expedient of omitting or not using immediately adjacent rods; while the space intervening the lowermost rods 29 in the rack 6 and the platform 8 affords convenient stacking room for used or clean pans 28, see Figs. 2 and 4.

Mounted within the compartment 19 by an appropriate bearing 33 is a gas burner 34 preferably of the line or Bunsen type, having a supply connection 35 and flow regulator 36. Also associated with the burner 34 is a thermostatic control or thermometer 37, for the maintenance of any desirable degree of moist gas in the proofing-cabinet 7. In addition, the combustion chamber 19 is provided with a pivoted damper 38 for regulating the flow of the conditioning medium through the passage or throat 20, hereinbefore referred to, said damper being regulatable by a snap switch 39, Fig. 1. Obviously an electric heater may be substituted for the gas burner 34, without departing from the spirit of this invention.

For supply of humidity to the gas generated by the burner 34, there is mounted on guides or runners 40 in the combustion chamber 19, immediately below the horizontal wall or partition 18, a drawer-like receptacle or tray 41, said tray being removable by aid of a hand-grasp 42, for replenishment with water as and when necessary.

Supply of air into the combustion chamber 19 is preferably by way of an aperture or apertures 43, in the base or platform 8 below the burner 34; while discharge of the vapor fumes arising from the proofing operation is by way of an outlet device 44 attached to the cabinet upper wall 17. The device 44 is preferably of hollow frusto-conical form, shown to best advantage in Fig. 3, with an adjustable deflector 45, Fig. 3, for variably regulating the discharge. A suitable baffle or baffles 46 attached below the partition 18 serve to collect condensation accumulating thereabove for gravity drainage into the container 41.

Having thus described my invention, I claim:

1. In a baker's cabinet, a proofing chamber with top, bottom, side and back walls and with an access door at the front; a heat and vapor generating compartment immediately below the proofing chamber and communicative therewith by way of a relatively narrow passage along the back wall of the cabinet; a regulatable damper for controlling vapor flow through said passage, a regulatable vapor outlet at the top of the proofing chamber; and means for slidably supporting within the proofing chamber, one above another in definite separation, a multiplicity of baking pans, with the rear edges of alternate pans spaced from the back wall of the chamber and the front edges substantially contacting the door when the latter is closed, with the rear edges of intervening pans substantially contacting the back wall and with their front edges spaced from the door, as and for the purpose set forth.

2. A baker's cabinet having the form of a combination unit with a proofing chamber characterized as in claim 1, and with an open rack in juxtaposed aligned relation to the proofing chamber, said rack being accessible at the front for introduction of the baking pans, and having at opposite sides thereof horizontally-arranged ledge bars for slidably supporting the pans in vertically spaced relation as in said chamber.

3. In a cabinet for baker's use, a proofing chamber with top, bottom, side and back walls, and an access door at the front; a hot vapor generating compartment in communication with the chamber at the bottom; a regulatable vapor outlet at the top of the proofing chamber; and means for slodably supporting a multiplicity of baking pans in separation one above another within the proofing chamber, comprising horizontally-arranged ledge rods in vertically spaced relation respectively on opposite side walls of the chamber, corresponding alternate rods of the two sets having their inner ends retroverted to form stops for arresting alternate trays with their rear edges spaced from the back wall of the chamber and with their front edges substantially contacting the door when closed, and the intermediate rods of the two sets being plain to allow the rear edges of intermediate pans to contact the back wall of the chamber with their front edges spaced from the door, as and for the purpose set forth.

GEORGE HELM.

(References on following page)

REFERENCES CITED

The following references are of record in the file of this patent:

UNITED STATES PATENTS

| Number | Name | Date |
|---|---|---|
| 412,466 | Case | Oct. 8, 1889 |
| 460,238 | Dawson | Sept. 29, 1891 |
| 488,014 | Kline et al. | Dec. 13, 1892 |
| 923,983 | Rasmussen | Aug. 3, 1909 |
| 1,137,752 | Goldstein | May 4, 1915 |
| 1,227,103 | Askew | May 22, 1917 |
| 1,325,506 | Burkhardt | Dec. 23, 1919 |
| 1,535,465 | Hackman | Apr. 28, 1925 |
| 1,541,673 | Valenta et al. | June 9, 1925 |
| 1,555,321 | Woodson | Sept. 29, 1925 |
| 1,601,376 | Sherer | Sept. 28, 1926 |
| 1,610,944 | Gloekler | Dec. 14, 1926 |
| 1,625,036 | Loudenslager | Apr. 19, 1927 |
| 1,748,123 | Gloekler | Feb. 25, 1930 |
| 1,769,048 | Anetsberger et al. | July 1, 1930 |
| 1,856,478 | Green | May 3, 1932 |
| 2,380,121 | Robertson | July 10, 1945 |

FOREIGN PATENTS

| Number | Country | Date |
|---|---|---|
| 102,000 | Austria | Dec. 10, 1925 |